(12) United States Patent
Couture, Jr. et al.

(10) Patent No.: US 7,946,412 B2
(45) Date of Patent: May 24, 2011

(54) RETRACTABLE BARRIER ASSEMBLY FOR CONVEYOR

(75) Inventors: Elie Couture, Jr., Beauport (CA); Eric Halstead, Beauport (CA)

(73) Assignee: Steris Inc., Temecula, CA (US)

( * ) Notice: Subject to any disclaimer, the term of this patent is extended or adjusted under 35 U.S.C. 154(b) by 460 days.

(21) Appl. No.: 11/674,329

(22) Filed: Feb. 13, 2007

(65) Prior Publication Data
US 2007/0193855 A1    Aug. 23, 2007

Related U.S. Application Data

(60) Provisional application No. 60/774,564, filed on Feb. 17, 2006.

(51) Int. Cl.
*B65G 47/46* (2006.01)

(52) U.S. Cl. ............... 198/370.07; 198/369.3; 198/451; 198/457.01; 198/459.6

(58) Field of Classification Search ............ 198/370.07, 198/369.2, 369.3, 369.5, 370.04, 370.05, 198/370.02, 451, 530
See application file for complete search history.

(56) References Cited

U.S. PATENT DOCUMENTS

| | | | |
|---|---|---|---|
| 3,235,101 A | 2/1966 | Milhaupt | 214/11 |
| 3,792,757 A | 2/1974 | Musser | 186/1 AC |
| 3,978,970 A | 9/1976 | Reimers | 198/425 |
| 4,041,646 A * | 8/1977 | Mittag | 49/385 |
| 4,082,174 A * | 4/1978 | Stobb | 198/368 |
| 5,244,100 A | 9/1993 | Regier et al. | 209/556 |
| 5,513,936 A | 5/1996 | Dean | 414/273 |
| 5,709,050 A * | 1/1998 | Benko | 49/109 |
| 6,138,812 A * | 10/2000 | Kimener | 193/35 G |
| 6,212,826 B1 * | 4/2001 | Kimener | 49/97 |
| 6,357,985 B1 | 3/2002 | Anzani et al. | 414/331.05 |
| 6,837,296 B2 * | 1/2005 | Kimener | 160/201 |

OTHER PUBLICATIONS

Gilmore-Kramer Co., "Model 190-ABEZ Live Roller Conveyor," Product literature, Aug. 20, 2005, entire document.

* cited by examiner

*Primary Examiner* — Gene Crawford
*Assistant Examiner* — Kavel Singh
(74) *Attorney, Agent, or Firm* — Kusner & Jaffe; Michael A. Centanni (57) ABSTRACT

A conveyor for moving objects along a path is comprised of a plurality of spaced-apart rollers that define the path of the conveyor. The upper edges of the rollers are aligned to define the surface of the path. Two spaced-apart side rails having inward-facing surfaces define two side boundaries of the path. A barrier assembly is disposed within a gap in one of the side rails for facilitating loading and unloading of objects onto the conveyor from one side of the conveyor. The barrier assembly is comprised of a mounting plate mounted to the conveyor and a barrier pivotally mounted to the mounting plate. The barrier has a wall section generally aligned with the inward-facing surface on one of the side rails. The barrier is movable between a first position wherein the wall section is elevated relative to the upper edges of the roller and a second position wherein the wall section is disposed below the upper edge of the rollers.

8 Claims, 9 Drawing Sheets

RETRACTABLE BARRIER ASSEMBLY FOR CONVEYOR

This application claims the benefit of U.S. Provisional Application No. 60/774,564, filed on Feb. 17, 2006

FIELD OF THE INVENTION

The present invention relates generally to conveyor systems and more particularly to an assembly for allowing the loading and unloading of articles onto and from a conveyor system. The present invention is particularly applicable to conveyors for medical washers having loading stations for loading and unloading large baskets containing articles to be washed. It will of course be appreciated that the present invention has other, broader application.

BACKGROUND OF THE INVENTION

It is known to use tunnel washers to wash medical devices. The articles or devices to be washed are often conveyed on a conveyor through the tunnel washer in large baskets. It is not unusual for baskets containing the medical devices to weigh in excess of 135 lbs. Conveyors for such heavy baskets typically have guides along the sides thereof to prevent the heavy baskets from falling off the conveyor.

At certain locations along the conveyor, loading and unloading stations are provided. Baskets are loaded onto the conveyor and removed therefrom at these locations. Such baskets are usually transferred from a transfer cart onto the conveyor, and then the baskets (and the medical devices) are conveyed through the washer. At these locations (stations), the side barriers of the conveyor must be removed or manually moved out of the way, i.e., repositioned, to allow a basket to be loaded onto the conveyor, or to be unloaded therefrom.

When loading or unloading a basket onto or from a conveyor, an operator is typically positioned to one side of the transfer cart where he or she can operate the side barrier. In this position, the operator is required to use one hand to reposition the barrier while using the other hand to load the basket onto the conveyor or to remove the basket therefrom. As will be appreciated, pulling or pushing a basket typically weighing upward of 135 lbs. from the side of the transfer cart requires significant strength in the upper torso and arms of the operator. Moreover, such non-ergonomic movement makes the operator more susceptible to back and neck injuries.

The present invention overcomes these and other problems and provides a movable barrier that automatically moves into a basket loading or unloading position once a transfer cart is in engagement therewith.

SUMMARY OF THE INVENTION

In accordance with the present invention, there is provided a conveyor for moving objects along a path. The conveyor is comprised of a plurality of spaced-apart rollers that define the path of the conveyor. The upper edges of the rollers are aligned to define the surface of the path. Two spaced-apart side rails having inward-facing surfaces define two side boundaries of the path. A barrier assembly is disposed within a gap in one of the side rails for facilitating loading and unloading of objects onto the conveyor from one side of the conveyor. The barrier assembly is comprised of a mounting plate mounted to the conveyor and a barrier pivotally mounted to the mounting plate. The barrier has a wall section generally aligned with the inward-facing surface on one of the side rails. The barrier is movable between a first position wherein the wall section is elevated relative to the upper edges of the roller and a second position wherein the wall section is disposed below the upper edge of the rollers.

In accordance with another aspect of the present invention, there is provided a conveyor having a plurality of spaced-apart rollers that define a conveyor path and two spaced-apart rails having inward-facing surfaces that define the side boundaries of the path. A barrier assembly is positioned in a gap in one of the rails to allow loading and unloading of the conveyor through the gap. The barrier assembly is comprised of a mounting plate mounted to the conveyor and a barrier pivotally mounted to the mounting plate along an axis that is generally parallel to the conveyor path. The barrier is comprised of a plate mounted to the mounting plate to pivot along one edge about the axis. The plate has a downward-extending wall section formed along another edge of the plate. The barrier is movable between a first position wherein the wall is elevated relative to the upper surfaces of the conveyor rollers and a second position wherein the wall section is disposed below the upper surfaces of the rollers. The plate is in a generally horizontal position when the barrier is in the second position and defines a second path intersecting the conveyor path.

In accordance with another aspect of the prevent invention, there is provided a conveyor for moving objects along a first path. The conveyor is comprised of a plurality of spaced-apart rollers that define the first path of the conveyor. The upper edges of the rollers are aligned to define the surface of the first path. Two spaced-apart side rails have inward-facing surfaces that define two side boundaries of the path. A pair of spaced-apart lateral rail sections extends between the side rails. A plurality of rollers extends from the lateral rail sections to define a second path that intersects the first path. A gap is defined in one of the side rails. The gap is formed between the lateral rail sections. A barrier assembly is disposed within the gap in one of the side rails for facilitating loading and unloading of objects along the second path onto the conveyor from one side of the conveyor. The barrier assembly has a barrier that is movable between a first position wherein the barrier is elevated relative to the upper edges of the roller and a second position wherein the barrier is disposed below the upper edge of the rollers.

An advantage of the present invention is a loading and unloading station for transferring a container, such as a basket, onto a conveyor from a transfer cart, and for unloading containers from a conveyor to a transfer cart.

Another advantage of the present invention is a barrier assembly as described above that reduces the number of steps required for transferring a container to or from a conveyor.

Another advantage of the present invention is a barrier assembly for a conveyor as described above wherein the barrier assembly has a barrier that is automatically movable from a barrier position to a loading and unloading position upon engagement with a transfer cart.

A still further advantage of the present invention is a barrier assembly for a conveyor that allows a more ergonomic movement of a container onto or from a conveyor.

These and other advantages will become apparent from the following description of an illustrated embodiment taken together with the accompanying drawings and the appended claims.

BRIEF DESCRIPTION OF THE DRAWINGS

The invention may take physical form in certain parts and arrangement of parts, one embodiment of which will be described in detail in the specification and illustrated in the accompanying drawings which form a part hereof, and wherein.

DETAILED DESCRIPTION OF PREFERRED EMBODIMENT

Figure 1:
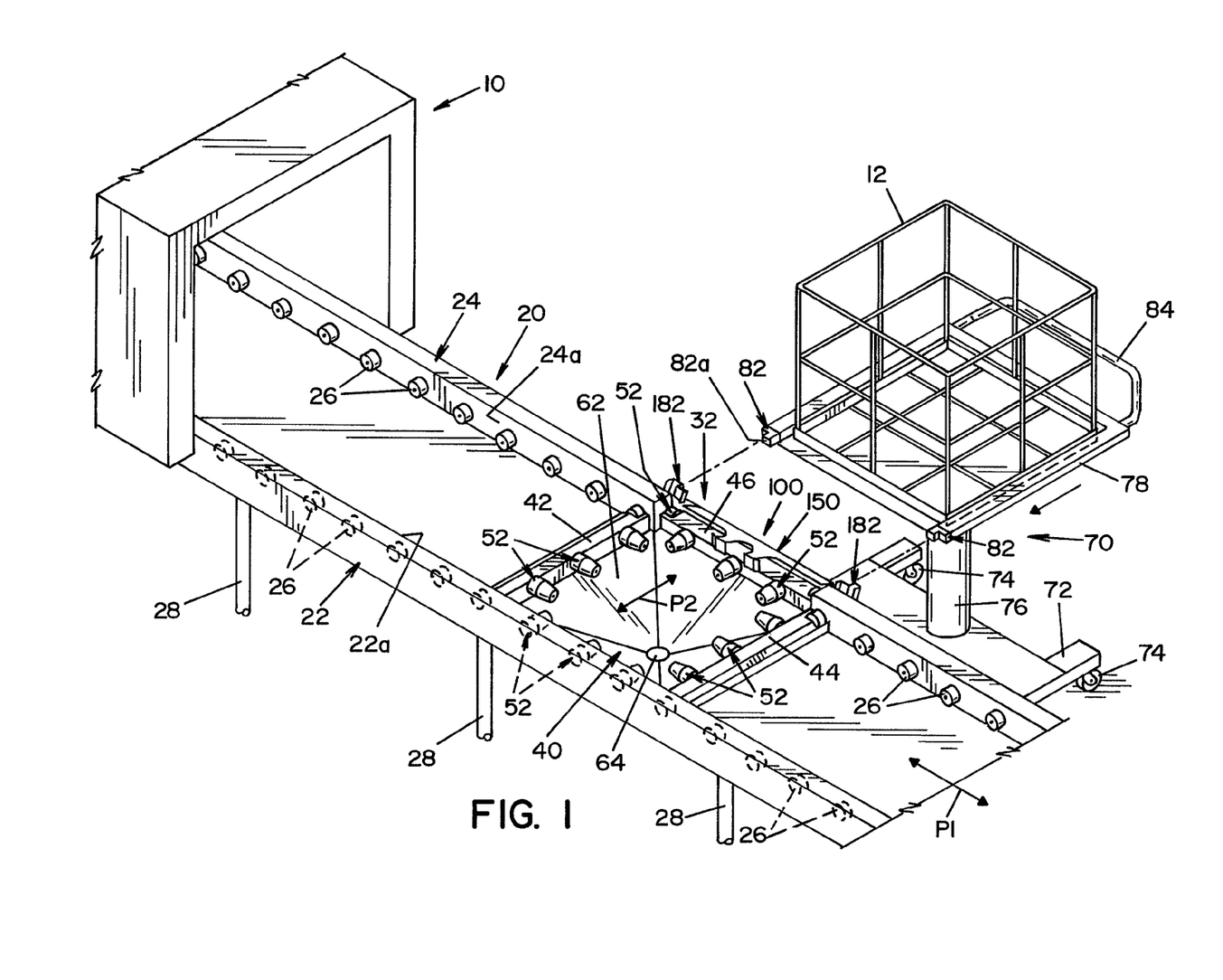
FIG. 1 is a perspective view of a roller conveyor for a tunnel washer having a loading and unloading station and barrier assembly according to the present invention.

Referring now to the drawings wherein the showings are for the purpose of illustrating an embodiment of the invention only, and not for the purpose of limiting same, FIG. 1 shows washer 10 and a conveyor system 20 for conveying a basket 12 into or out of washer 10. Conveyor 20 is comprised of two spaced-apart side rails 22, 24. Side rail 22 has an inner surface 22a and side rail 24 has an inner surface 24a. Each of side rails 22, 24 also has a plurality of spaced-apart rollers 26 mounted thereto. Rollers 26 are cylindrical in shape, and are positioned such that the upper surface of rollers 26 defines a continuous plane. Inner surfaces 22a, 24a and the continuous plane defined by rollers 26 define a conveyor path "P1" into or out of washer 10 along which basket 12 may be conveyed. In this respect, the upper edges of rollers 26 define the surface of path "P1." Rollers 26 are disposed such that upper portions of inner surfaces 22a, 24a of side rails 22, 24 extend above conveyor path "P1." Side rails 22, 24 define the side boundaries of path "P1."

Rollers 26 may be driven by a chain that extends through side rails 22, 24. Conveyor 20 is supported at a predetermined elevation relative to washer 10 by support legs 28. A gap 32 is formed in rail 24 to define a loading/unloading station 40 for loading a basket onto conveyor 20, or for removing a basket therefrom.

Loading/unloading station 40 is defined by two spaced-apart lateral rail sections 42, 44 that extend between side rails 22, 24. Lateral rail sections 42, 44 are dimensioned such that the upper surface thereof is disposed below the upper surface of rollers 26 on side rails 22, 24. A longitudinal rail section 46 is disposed in gap 32 in side rail 24. Longitudinal rail section 46 is aligned with side rail 24 and spans gap 32. As with lateral rail sections 42, 44, the upper surface of longitudinal rail section 46 is disposed below the plane defined by the upper edges of spaced-apart rollers 26 on side rails 22, 24. Auxiliary rollers 52 are provided on lateral rail sections 42, 44, on longitudinal rail section 46 and on that portion of side rail 22 that extends between lateral rail sections 42, 44. Auxiliary rollers 52 have a cylindrical section 52a that have an outer diameter essentially matching that of rollers 26 on side rails 22, 24, and a frusto-conical section 52b. Auxiliary rollers 52 are disposed such that cylindrical portions 52a thereof are generally aligned and disposed in the same plane as rollers 26 on side rails 22, 24. Cylindrical portions 52a of auxiliary rollers 52 on auxiliary rollers 52 of lateral rail sections 42, 44 define a loading path "P2" that intersects path "P1." It should be appreciated that loading path "P2" can be used for loading and unloading items to and from conveyor 20.

Figure 6:
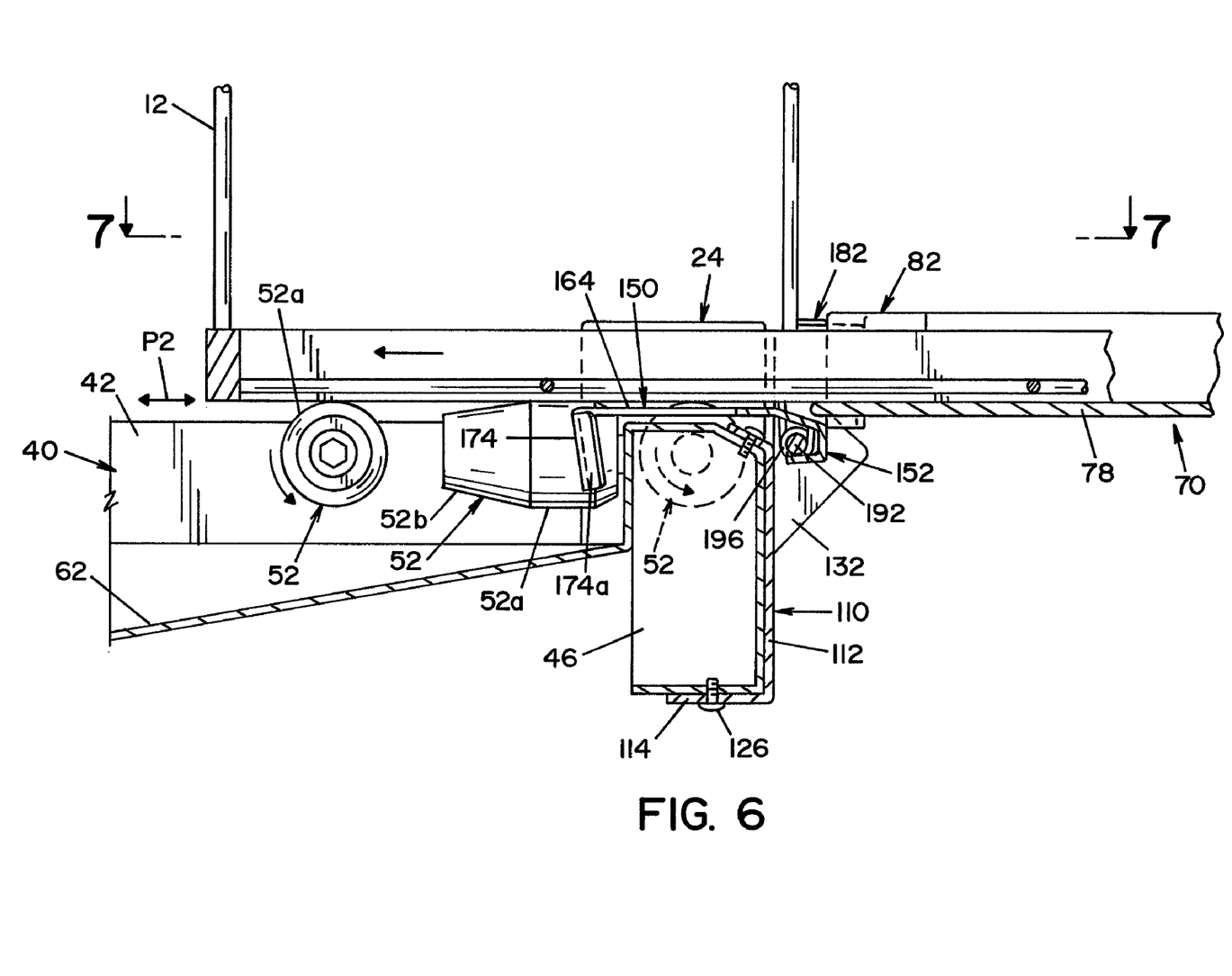
FIG. 6 is a sectional view showing a basket being transferred from a transfer cart onto the conveyor.

A tray or pan 62 is disposed below loading/unloading station 40. Tray 62 has an opening 64 formed in the bottom thereof. Tray 62 has a funnel-like configuration. Loading/unloading station 40 is dimensioned to allow basket 12 to roll onto conveyor 20 from the side thereof, as illustrated in FIG. 6. In this respect, auxiliary rollers 52 on loading/unloading station 40 are disposed such that basket 12 rolls along auxiliary rollers 52 on lateral rail sections 42, 44 along loading path "P2" when basket 12 is slid onto conveyor 20 from the side thereof. Basket 12 rolls on auxiliary rollers 52 on side rail 22 and longitudinal rail section 46 when basket 12 moves along conveyor path "P1."

Figure 4:
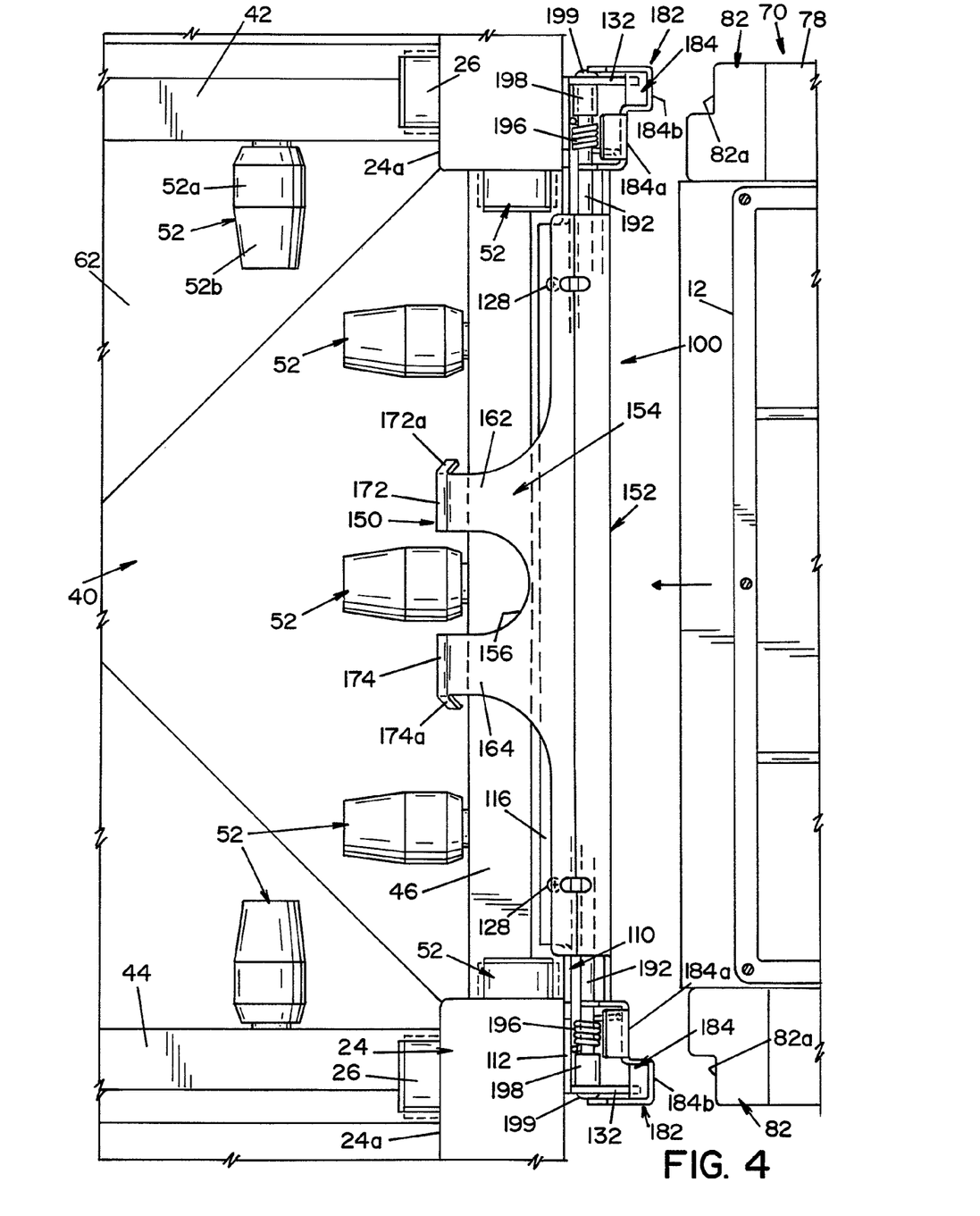
FIG. 4 is a view taken along lines 4-4 of FIG. 3.

In the embodiment shown, a transfer cart 70 is provided for transferring basket 12 from another location onto, or off of, conveyor 20 at loading/unloading station 40. In the embodiment shown, transfer cart 70 has a lower frame 72 with casters 74 thereon. Lower frame 72 supports a post 76 having an upper frame 78 thereon. Upper frame 78 defines a support surface on which basket 12 rests. Upper frame 78 has end pieces 82 having a predetermined surface profile 82a. In the embodiment shown, end pieces 82 are notched, as best seen in FIG. 4. In the embodiment shown, notched portion 82a of end pieces 82 of upper frame 78 are formed of a tough durable polymeric material. A handle 84 is attached to upper frame 78 to facilitate movement of transfer cart 70.

Figure 2:
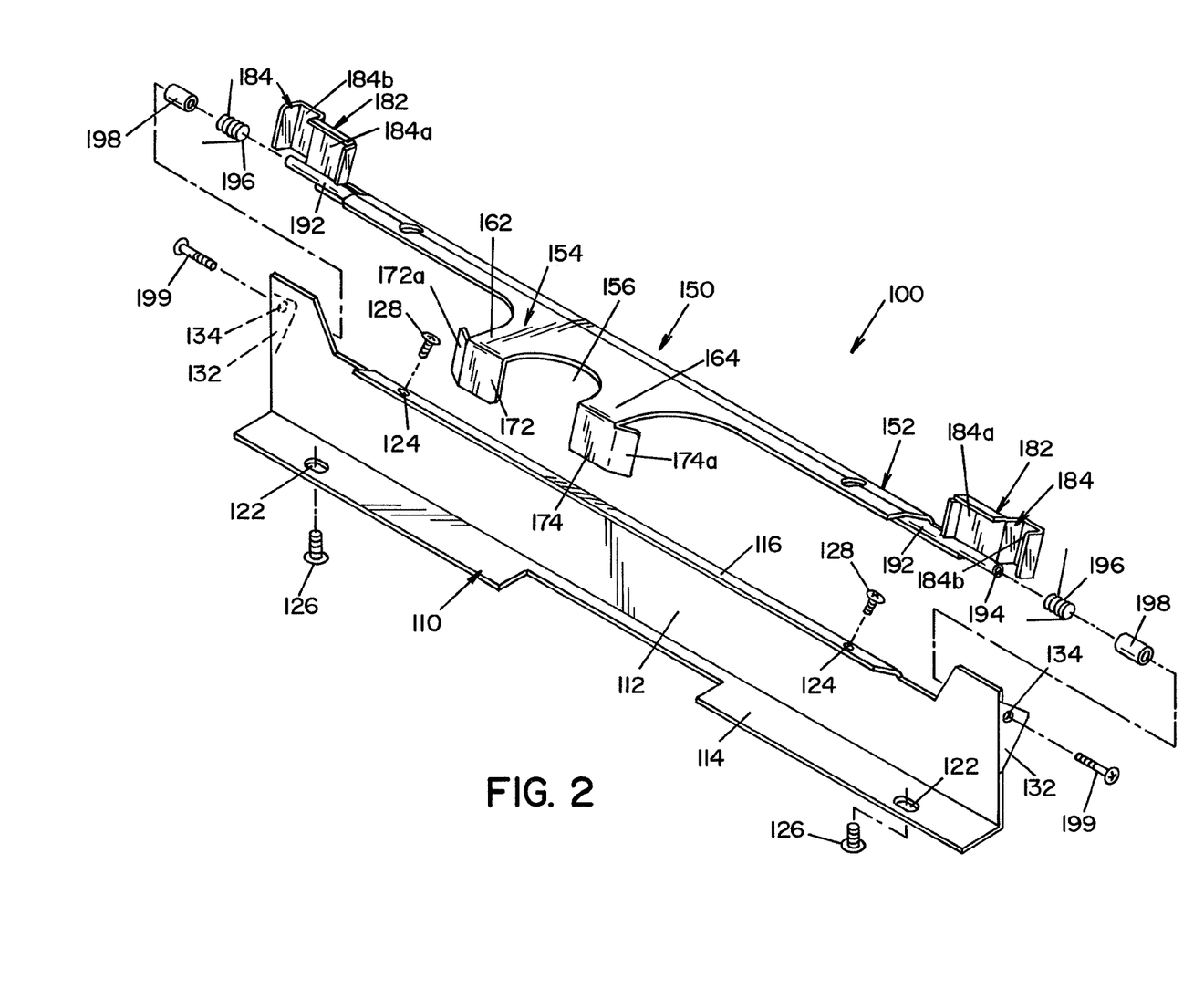
FIG. 2 is an exploded view of the barrier assembly shown in FIG. 1, illustrating one embodiment of the present invention.
Figure 3:
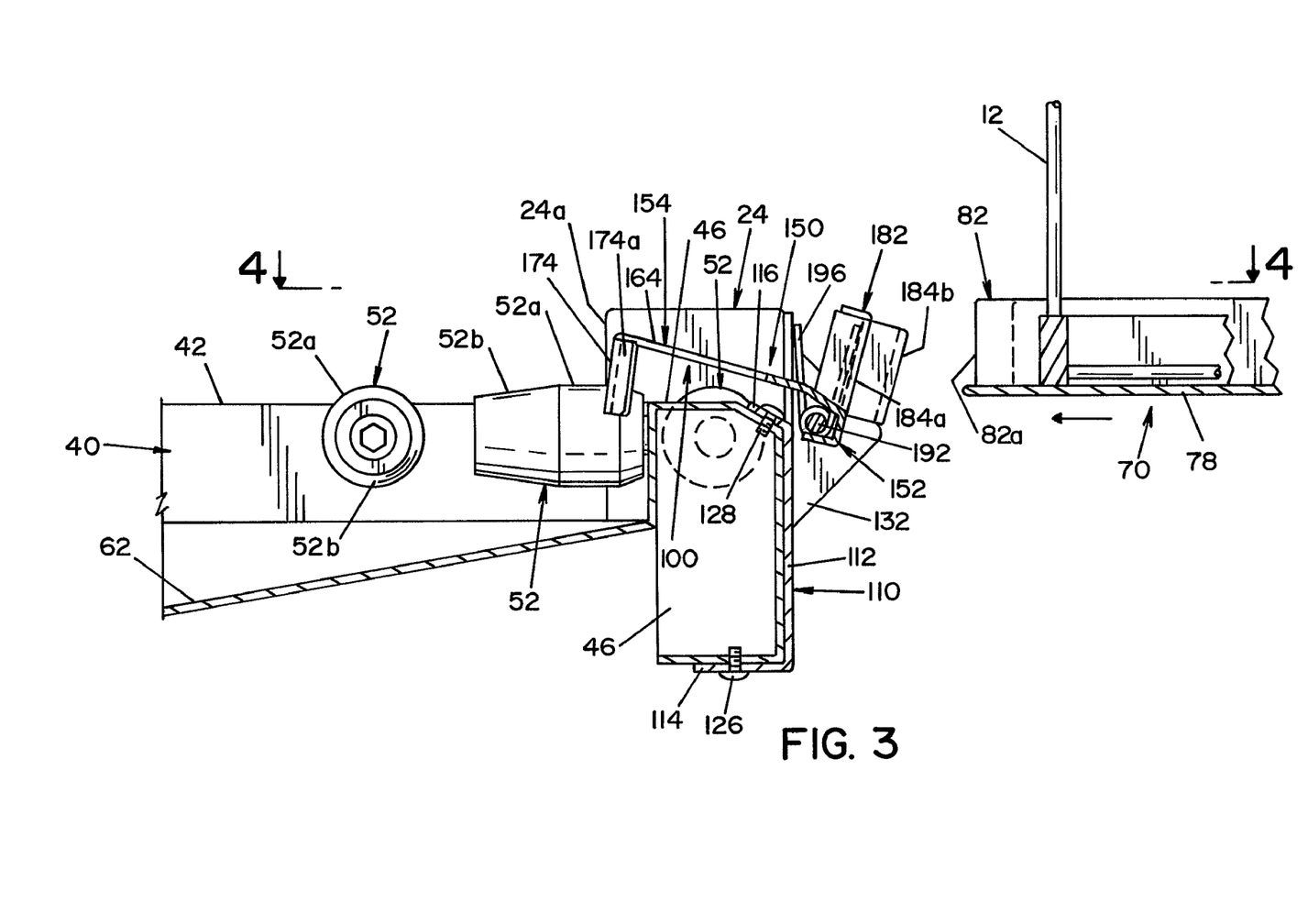
FIG. 3 is a sectioned, elevational view of the barrier assembly mounted to a section of a conveyor frame, showing a transfer cart and basket disposed relative thereto.

Referring now to FIG. 2, a barrier assembly 100 is shown. Barrier assembly 100 is comprised of a mounting plate 110 and a movable barrier 150 that is pivotally mounted to mounting plate 110. Mounting plate 110 is dimensioned to be attached to longitudinal rail section 46 of loading/unloading station 40. Mounting plate 110 includes a planar panel 112, a lower flange 114, and an upper flange 116. As best seen in FIG. 3, mounting plate 110 has an inner surface profile dimensioned to correspond to the outer surface profile of longitudinal rail section 46. Openings 122, 124 are provided in lower flange 114 and upper flange 116, respectively, to receive fasteners 126, 128 that attach mounting plate 110 to longitudinal rail section 46. Each end of mounting plate 110 includes an outwardly extending tab or bracket 132 having an aperture 134 therethrough. In the embodiment shown, mounting plate 110 is integrally formed from a metallic sheet.

Barrier 150 includes an elongated, tubular or sleeve-like portion 152 and a plate portion 154 that extends to one side of tubular portion 152. Plate portion 154 includes a centrally located notch 156 that defines two spaced-apart arm portions 162, 164. At the end of arm portions 162, 164, wall sections 172, 174 are formed, respectively. Wall sections 172, 174 extend downward at an angle relative to arm portion 162, 164 of barrier 150. Each wall section includes an edge 172a, 174a that is bent backward toward tubular sleeve portion 152. These edges 172a, 174a of wall sections 172, 174 define guide surfaces.

Stops or abutments 182 are formed at the ends of tubular portion 152 of barrier 150. Stops or abutments 182 have outer surface profiles generally matching the outer surface profile of end pieces 82 of upper surface 78 of transfer cart 70, as best seen in FIG. 4. Abutments 182 define generally L-shaped voids or cavities 184, as best seen in FIG. 2. Cavities 184 have a first section 184a and a second section 184b. In the embodiment shown, barrier 150 is integrally formed from a metallic sheet.

A rod 192 extends through sleeve portion 152 of barrier 150. Rod 192 is dimensioned such that the distal ends thereof extend beyond the ends of sleeve portion 152. Each end of rod portion 192 includes an internally-threaded, bored opening 194. As best seen in FIGS. 3, 5, 6, and 8, rod 192 is disposed below the upper edges of rollers 26 and below the plane of path "P1." The axis of rod 192 extends generally parallel to path "P1."

Barrier 150 is dimensioned to be disposed between brackets 132 on mounting plate 110. A torsion spring 196 is mounted to each end of rod 192. Torsion springs 196 disposed on rod 192 to be disposed on section 184a of cavity 184 defined by abutment or stops 182. On each end of rod 192, a bushing 198 is provided adjacent torsion spring 196. A conventional fastening 199 extends through opening 134 in bracket 132 on mounting plate 110, and secures rod 192 and barrier 150 to mounting plate 110. The ends of torsion spring 196 are captured between abutment 182 and the face of mounting panel 110.

Torsion springs 196 are operable to bias barrier 150 to a first position, best seen in FIG. 3, wherein wall sections 172, 174 of barrier 150 are disposed above the upper surface of auxiliary rollers 52. Barrier 150 is movable to a second, down position, best seen in FIG. 5. As best seen in FIG. 4, notch 156 in plate portion 154 of barrier 150 accommodates the middle auxiliary roller 52 of loading/unloading station 40.

Figure 5:
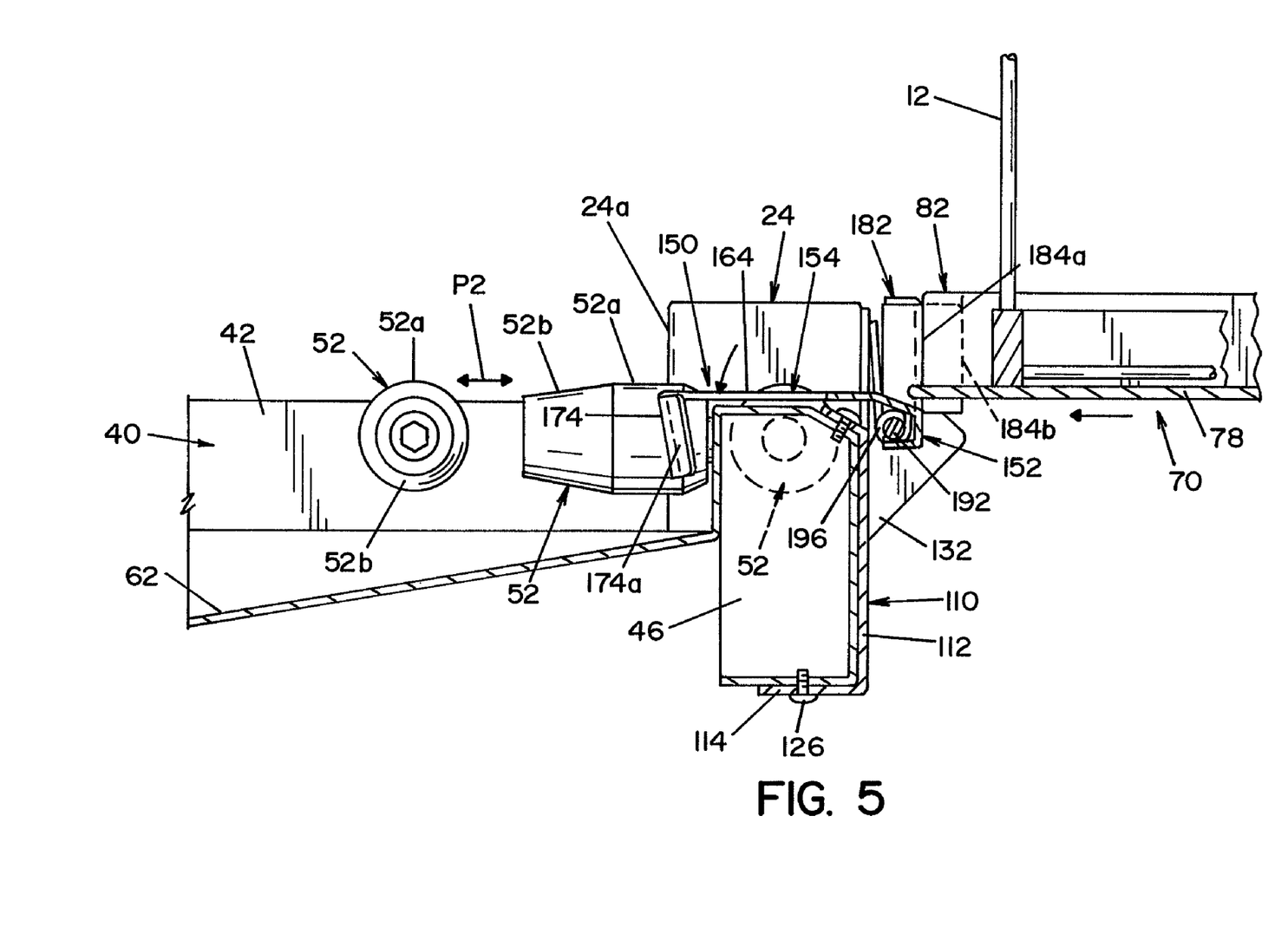
FIG. 5 is a sectional view of the barrier assembly with a transfer cart in engagement therewith, showing the barrier assembly in a loading position.
Figure 7:
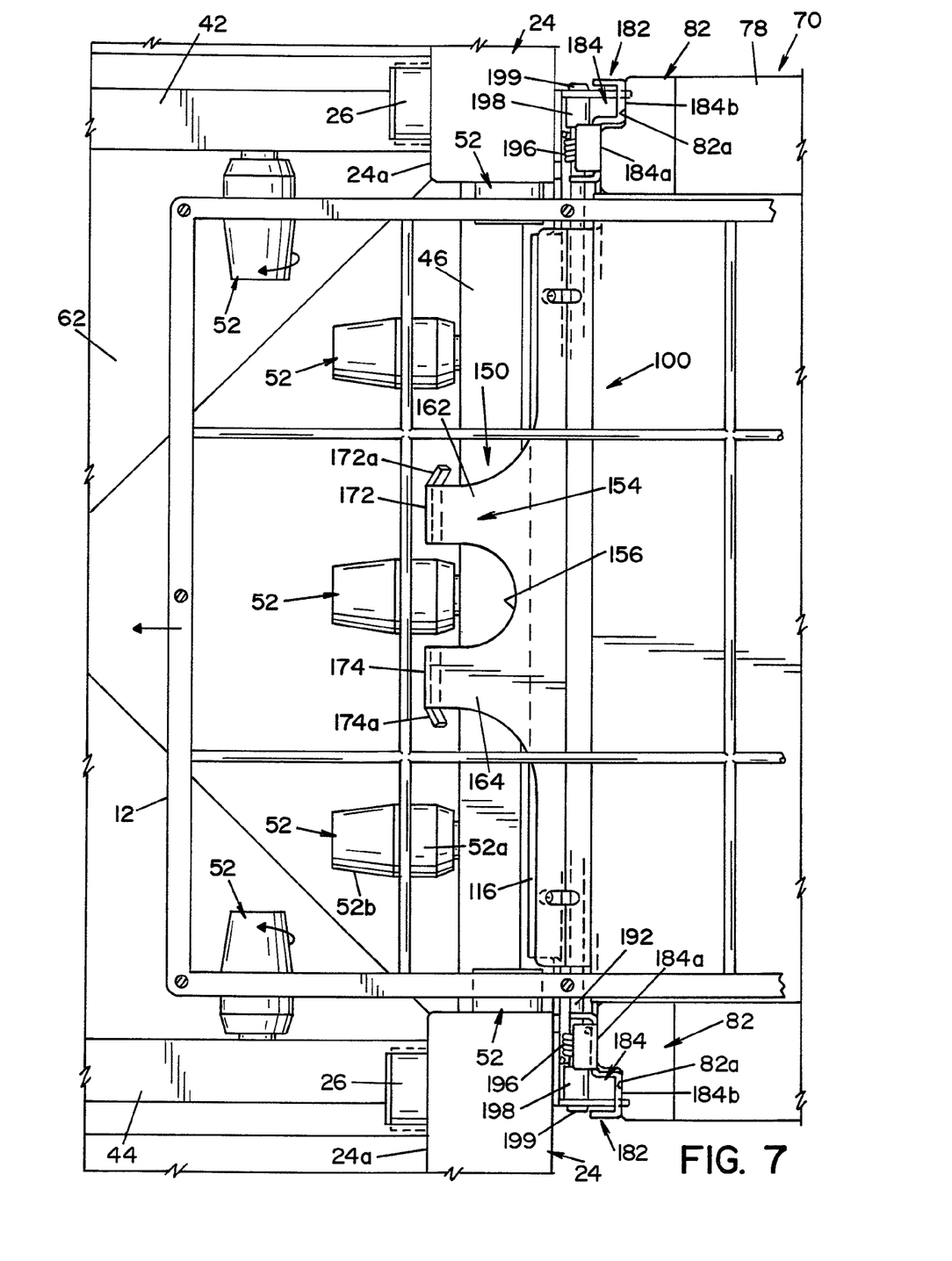
FIG. 7 is a view taken along lines 7-7 of FIG. 6.
Figure 8:
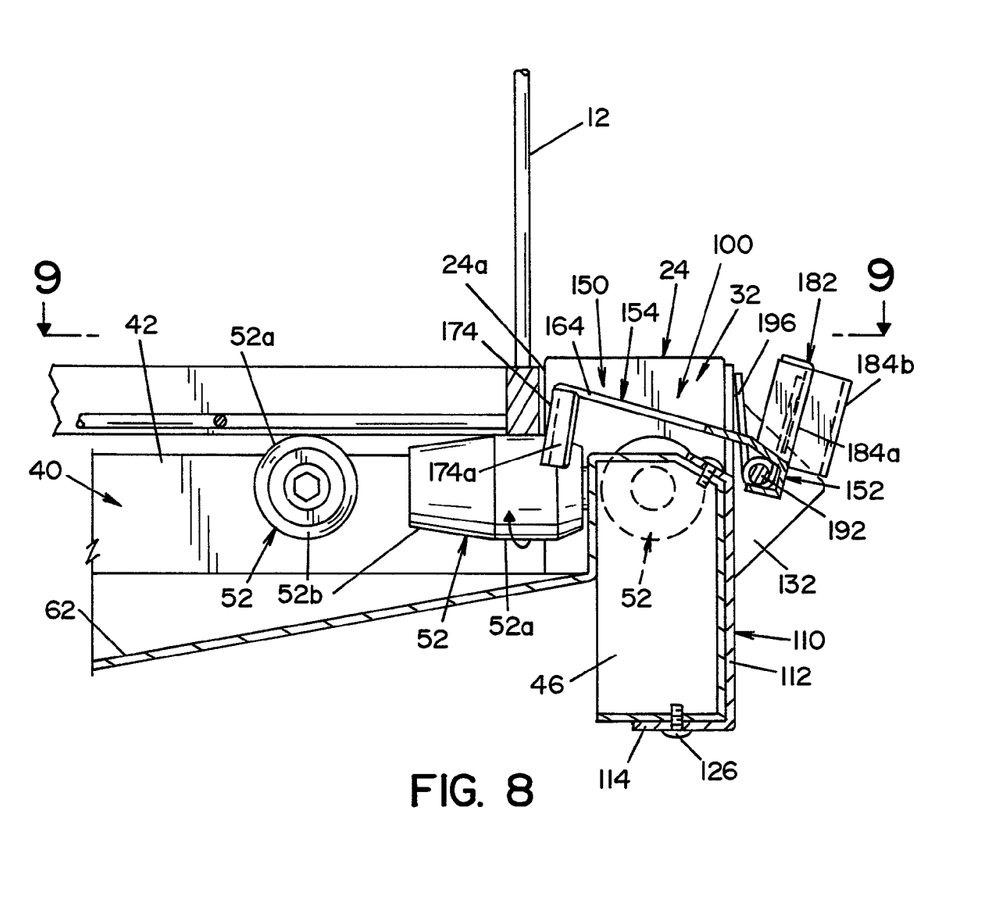
FIG. 8 is a sectional view of the barrier assembly showing a basket on the conveyor and the barrier assembly in a barrier position.
Figure 9:
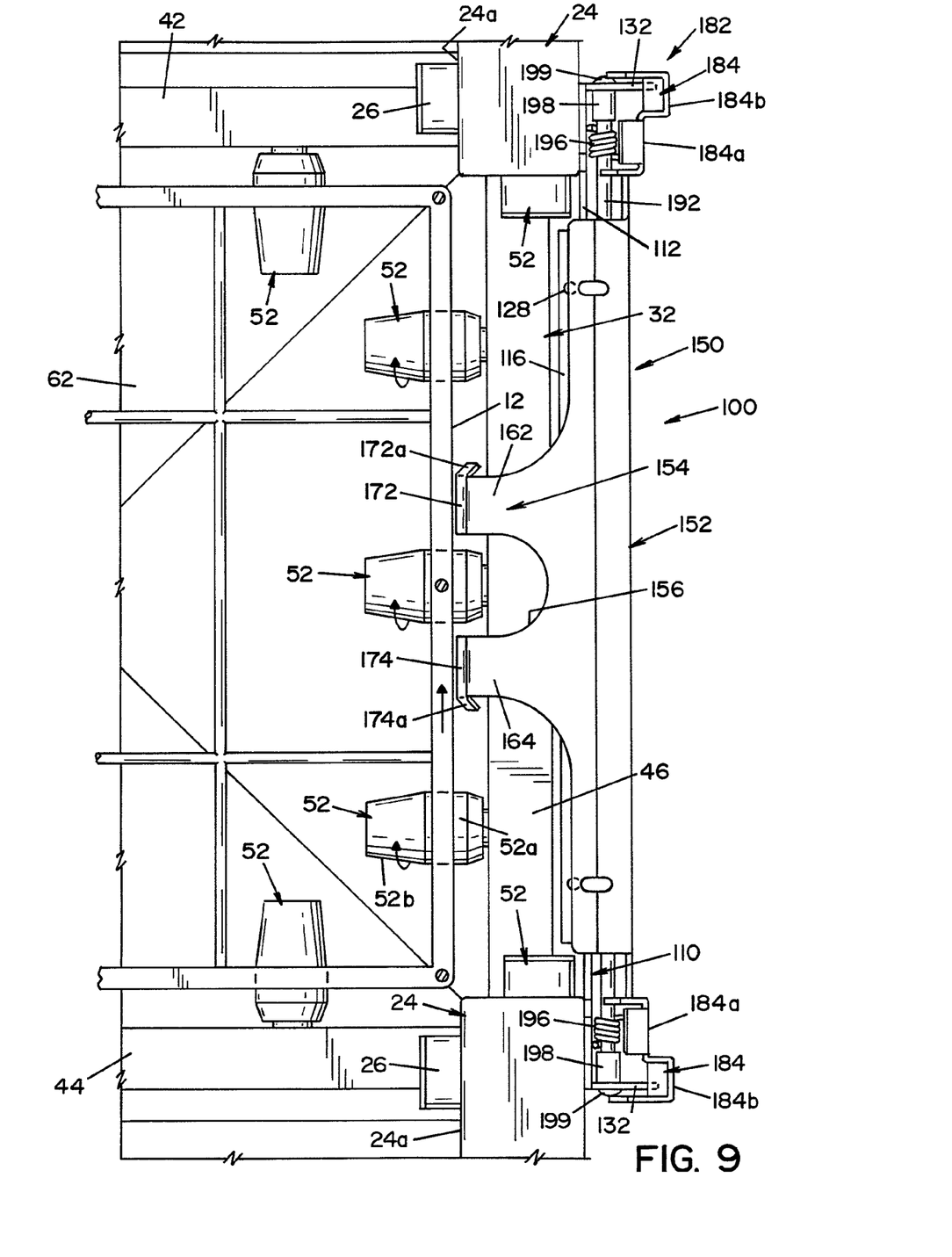
FIG. 9 is a view taken along lines 9-9 of FIG. 8.

Referring now to the operation of barrier assembly 100, loading a basket 12 onto conveyor 20 shall be described. FIGS. 3 and 4 show basket 12 on transfer cart 70 moving toward barrier assembly 100. Barrier 150 is in its normal, first position wherein wall sections 172, 174 of barrier 150 are in an elevated position relative to auxiliary rollers 52. As illustrated in FIG. 4, abutments 182 on barrier 150 are disposed and dimensioned to mate with end pieces 82 on upper frame 78 of transfer cart 70 when transfer cart 70 is properly aligned with loading/unloading station 40. If transfer cart 70 is properly aligned with loading/unloading station 40, end pieces 82 of upper frame 78 of transfer cart 70 will engage abutments 182 on barrier 150 and cause barrier 150 to move from its first position to its second, down position as shown in FIG. 5. In this position, the upper surface of plate portion 154 forms a horizontal surface along which basket 12 may be pushed, as illustrated in FIGS. 6 and 7. When barrier 150 is in its second down position, the upper surface of plate portion 154 of barrier 150 is below the upper surface of auxiliary rollers 52, i.e., below loading path "P2," as best seen in FIGS. 6 and 7. In this respect, auxiliary rollers 52 support basket 12 as it moves onto loading/unloading station 40 of conveyor 20. Once basket 12 is on conveyor 20, transfer cart 70 may be moved away from loading/unloading station 40. As illustrated in FIG. 8, with the removal of transfer cart 70, barrier 150 moves to its normal first position with wall sections 172, 174 of barrier 150 elevated above the upper surface of auxiliary rollers 52. As shown in FIG. 8, when barrier 150 is in its upper position, wall sections 172, 174 of barrier 150 are generally coplanar with inner surface 24a of side rail 24, thereby forming a barrier preventing basket 12 moving along conveyor 20 from sliding off conveyor 20 through gap 32 in side rail 24. Likewise, upper portions of inner surfaces 22a and 24a prevent basket 12 moving along conveyor 20 from sliding off conveyor path P1 of conveyor 20.

Unloading basket 12 from conveyor 20 is essentially the reverse of the loading process described above. It should be appreciated that the motions required of an operator to load and unload basket 12 onto and from conveyor 20 in the present invention reduces the amount of unnatural and unusual motion required by the operator in a typical conveyor loading and unloading process.

The present invention thus provides an automatic movable barrier assembly 100 for loading and unloading conveyor 20 that does not require an operator to manually move a barrier element in order to load or unload basket 12 from conveyor 20. The operator may remain in position by handle portion 84 of transfer cart 70 and push basket 12 onto conveyor 20 from this location, or pull basket 12 from conveyor 20 onto transfer cart 70.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A conveyor for moving objects along a conveyor path in a first direction, said conveyor comprised of:
  a plurality of spaced-apart rollers defining said conveyor path of said conveyor, the upper edges of said rollers being aligned to define the surface of said conveyor path;
  two spaced-apart side rails having inward-facing surfaces that extend above said upper edges of said plurality of spaced-apart rollers to define two side boundaries of said conveyor path, one of said side rails having a gap formed therein to define a loading/unloading station for loading and unloading objects onto said conveyor in a second direction, said second direction being generally transverse to said first direction; and
  a barrier assembly disposed within said gap formed in said one of said side rails, said barrier assembly comprised of:
    a mounting plate mounted to said conveyor; and
    a barrier pivotally mounted to said mounting plate along an axis generally parallel to said first direction, said barrier having a wall section generally aligned with the inward-facing surface on said one of said side rails, said barrier being movable within said gap between a first position wherein said wall section is elevated relative to the upper edges of said roller to define a portion of one of said side boundaries of said conveyor path and a second position wherein said wall section is disposed below the upper edge of said rollers, thereby allowing movement of objects onto said conveyor through said gap in said second direction.

2. A conveyor as defined in claim 1, wherein said barrier includes a planar plate portion that is connected to said wall section, said plate portion defining a sliding surface, said plate portion being oriented at an angle when said barrier is in said first position and being generally horizontal when said barrier is in said second position.

3. A conveyor as defined in claim 1, wherein said barrier includes a biasing element biasing said barrier to said first position.

4. A conveyor as defined in claim 3, wherein said biasing element is a spring.

5. A conveyor as defined in claim 1, wherein said barrier defines a second path intersecting said conveyor path when said barrier is in said second position.

6. A conveyor as defined in claim 1, wherein said barrier includes abutment means facing outward from said conveyor, said abutment means engageable with a transport device for transporting an object to be loaded onto said conveyor, said barrier being movable from said first position to said second position when said transport device engages said abutment means.

7. A conveyor as defined in claim 6, wherein an object on said transport device is movable over said barrier onto said conveyor when said barrier is in said second position.

8. A conveyor as defined in claim 1, wherein said barrier is generally a plate, said plate having said wall section formed along one edge thereof and being pivotally mounted along another edge about an axis that is generally parallel to said first direction.

* * * * *